United States Patent [19]

Brown et al.

[11] Patent Number: 4,590,226

[45] Date of Patent: May 20, 1986

[54] POLYETHER POLYOLS CONTAINING HYDROXYMETHYL SUBSTITUTED 1,3-DIOXANE FOR USE IN POLYURETHANES

[75] Inventors: James P. Brown, Sterrebeek; William G. Carroll, Vossem; Ronald N. May, Brussels; Erik M. B. Merckx, Mechlin; David J. Sparrow, Overijse, all of Belgium

[73] Assignee: Imperial Chemical Industries Inc., London, England

[21] Appl. No.: 696,168

[22] Filed: Jan. 29, 1985

[30] Foreign Application Priority Data

Feb. 15, 1984 [GB] United Kingdom ............... 8404022

[51] Int. Cl.$^4$ .................................. C08G 18/14
[52] U.S. Cl. .................................. 521/174; 252/182; 528/73; 549/374
[58] Field of Search .............. 521/174; 528/73; 549/374; 252/182

[56] References Cited

U.S. PATENT DOCUMENTS

| | | | |
|---|---|---|---|
| 2,464,430 | 3/1949 | Barth et al. .................. | 549/374 |
| 2,945,008 | 7/1960 | Caldwell et al. .............. | 521/174 |
| 3,074,966 | 1/1963 | Barnes ........................ | 521/174 |
| 3,169,879 | 2/1965 | Wahl et al. .................. | 549/374 |
| 3,297,643 | 1/1967 | Gagliani ...................... | 549/374 |

*Primary Examiner*—Maurice J. Welsh
*Attorney, Agent, or Firm*—Cushman, Darby & Cushman

[57] ABSTRACT

A polyether polyol having an average hydroxyl value in the range 400 to 650 mgKOH/g which is a alkoxylated derivative of a polyhydric alcohol being itself a single compound or a mixture of compounds according to the general formula (I)

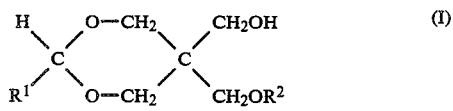

where
$R^1$ is —H, —$CH_3$ or $OCH_3$
$R^2$ is —H, —$CH_2OH$ or —$CH_2 C(CH_2OH)_3$ The preparation of polyurethanes, including rigid foams, using these polyols, is also disclosed.

12 Claims, No Drawings

POLYETHER POLYOLS CONTAINING HYDROXYMETHYL SUBSTITUTED 1,3-DIOXANE FOR USE IN POLYURETHANES

This invention relates to polyether polyols of a defined type, to their manufacture by alkoxylation of certain polyhydric alcohols and their conversion to polyurethanes by reaction with isocyanates.

It is already known to manufacture polyethers by the addition polymerisation of 1,2-alkylene oxides with compounds containing active hydrogen atoms, mainly hydroxy compounds and amines, in the presence of acidic or basic catalysts. Ethylene oxide and propylene oxide are commonly used and the desired polyethers can be extensively varied by altering the choice and amount of alkylene oxide reacted.

It is also already known to manufacture polyurethane materials by reacting hydroxyl-terminated polyethers with organic polyisocyanates, and to modify the reaction by inclusion of a gas-generating agent so as to produce foamed polyurethanes. It is known, for example in UK Pat. No. 1048016, to react pentaerythritol with 1,2-propylene oxide to make polyether and to use such polyethers in polyurethane manufacture. French Pat. No. 2508917 (equivalent to GB No. 2106506) also describes such a process, as does U.S. Pat. No. 3,277,076, U.S. Pat. No. 3,346,557, and Japanese Patent Publication No. 77 73808.

However pentaerythritol has a high melting point and low solubility in common non-reactive solvents which makes processing difficult.

It has been found that alkoxylation of a defined group of polyhydric alcohols, related to pentaerythritol provides advantages in processing and the polyether products give rise to advantages when used in the manufacture of polyurethanes, especially foams.

Accordingly, our invention provides a polyether polyol having an average hydroxyl value in the range 400 to 650 mgKOH/g which is an alkoxylated derivative of a polyhydric alcohol being itself a single compound or a mixture of compounds according to the general formula (I)

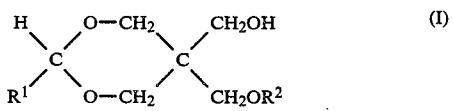

where
$R^1$ is —H, —CH$_3$ or —OCH$_3$
$R^2$ is —H, —CH$_2$OH or —CH$_2$C(CH$_2$OH)$_3$ The polyhydric alcohol according to formula (I) may be incorporated into polyether polyols in a variety of ways. The polyhydric alcohol is used as an initiator for alkoxylation with an alkylene oxide, such as propylene oxide, ethylene oxide, butylene oxide or mixtures of two or more alkylene oxides. Alkoxylation may take place sequentially with different alkylene oxides. Defined polyhydric alcohols may be alkoxylated as such or in admixture with other active hydrogen containing compounds such as other polyhydric alcohols, amines having at least two active hydrogen atoms and no hydroxy groups in the molecule or hydroxyalkylamines containing at least two active hydrogen atoms in the molecule, including hydroxy terminated polyesters, polyethers or polyesteramides.

When polyether polyol compositions according to the invention are prepared by reaction of mixed initiators with alkylene oxide, it is preferred that at least 10% by weight of the compounds used as initiators is a polyhydric alcohol according to formula (I) or a mixture of such polyhyric alcohols.

Alternatively various initiators may be alkoxylated separately and then the products of alkoxylation blended to achieve a desired composition.

When polyether polyol compositions according to the invention are prepared by blending alkoxylated compounds, preferably at least 10% by weight of the components used in the blend is an alkoxylated derivative of one or more polyhydric alcohols according to formula (I).

The polyether compositions described above may be blended with 5 to 95% by weight of hydroxyl terminated polyesters or polyesteramides. Adjustments to achieve the desired level of functionality and hydroxyl value may be made by selection of the polyhydric alcohols and control of the degree of alkoxylation respectively.

Where a polyhydric alcohol is present, other than one of the type defined above, it is preferably incorporated into the composition such that after alkoxylation the alkoxylated derivative forms at least 5% by weight of the polyether polyol composition and the polyhydric alcohol has the general formula (II) or is a mixture of compounds of that formula.

where $R^3$ and $R^4$, which may be the same or different, are selected from —H, —CH$_2$OH and —CH$_2$OCH$_3$ provided that only one of $R^3$ or $R^4$ may be —CH$_2$OCH$_3$; and
where $R^5$ is —OH, —OCH$_2$OH, or OCH$_2$C(CH$_2$OH)$_3$ Thus, a prefered polyether polyol composition comprises 10 to 95% of propoxylated polyhydric alcohols according to formula I and 5 to 50% of propoxylated polyhydric alcohols according to formula II, the remainder, if any, being alkoxylated polyhydric alcohols or alkoxylated amines or hydroxy terminated polyesters or mixtures thereof of known type for inclusion in polyurethane reactions.

The invention will be mainly described incorporating propylene oxide or ethylene oxide as the alkoxylating material. Mixed oxyalkylene units may be incorporated in the form of random or block copolymers. It will be noted that some pentaerythritol may be present as given in formula II type alcohols.

The preferred polyether polyol composition also has a preferred weight average functionality in the range 2 to 3, especially 2.3 to 2.8 and a more preferred hydroxyl value lies in the range 490 to 575 mg KOH/g, especially 535 to 565 mgKOH/g.

Specific polyols according to the above formula (I) which may be used are:
5-(5-hydroxy methyl-1,3-dioxane)-methanol ($R^1$=$R^2$=H)
5-(5-hydroxy methyl-2-methyl-1,3-dioxane)-methanol ($R^1$=CH$_3$, $R^2$=H)
5-(5-hydroxy methyl-1,3-dioxane)-methoxy-methanol ($R^1$=H, $R^2$=—CH$_2$OH)

5-(5-hydroxy methyl-1,3-dioxane)-(2,2-bishydroxymethyl)-4-oxa-pentanol ($R^1=H$, $R^2=CH_2-C(CH_2OH)_3$)

Specific polyols according to the above formula II which may be present are $CH_3C(CH_2OH)_3$
$C(CH_2OH)_4$
$C(CH_2OH)_3(CH_2OCH_2OH)$
$C(CH_2OH)_3[CH_2OCH_2C(CH_2OH)_3]$
$C(CH_2OH)_2(CH_2OCH_3)[CH_2OCH_2C(CH_2OH)_3]$ Alkoxylation is carried out under standard conditions for such reactions. The polyhydric alcohol is reacted with for example propylene and/or ethylene oxide in the presence of a catalyst under controlled conditions of pressure and temperature.

The product may be isolated by neutralisation or by treatment with ion exchange resin, by treatment with active carbon, natural or synthetic absorbent earths or mixtures thereof, followed by filtration. The polyether polyols prepared according to the process of the present invention have several uses, such as the manufacture of polyesters and surfactants, but they are found to be particularly suitable for reaction with organic di- or polyisocyanate in the production of cellular or non cellular polyurethanes.

Thus, the present invention includes the manufacture of polyurethane products, for example polyurethane foams, in known manner, from the polyether polyol described above, and also includes polyurethane products so prepared. Polyurethane products are made by reacting a di-or polyisocyanate with the described polyether polyol. The nature of the polyurethane product, for example the polyurethane foam may be varied depending on a variety of factors such as the functionality of the reactants and the presence of active ingredients.

The organic di- or polyisocyanate may be any of the isocyanates known to be useful for the formation of polyurethane products such as polyurethane foams. Of particular interest are aromatic di- or polyisocyanates, for example tolylene diisocyanate and especially diphenylmethane diisocyanate (MDI) which are commercially available in a variety of forms. Suitable diphenylmethane di-isocyanates include:

(a) diphenylmethane-4,4'-diisocyanate and mixtures thereof with other isomers of diphenylmethane diisocyanate;

(b) methylene bridged polyphenylpolyisocyanates prepared by phosgenation of mixtures of appropriate polyamines obtained by the condensation of aniline and formaldehyde and known as "polymeric" MDI, the composition of which may subsequently be varied by distillation, crystallisation or other separation techniques to give products with a weight average functionality in the range 2 to at least 3.3;

(c) polymers and oligomers obtained by reacting diphenylmethane diisocyanates or "polymeric MDI" with a monomeric glycol or polyhydric alcohol (or mixtures thereof) or with a hydroxyl-ended polyester or polyether and known as "MDI prepolymers"; and (d) modified diphenylmethane diisocyanates or "polymeric MDI" in which a proportion of the isocyanate groups are converted into other groups such as carbodiimide, uretonimine, biuret or allophanate groups, or in which a proportion of the isocyanate groups are reacted with an isocyanate-reactive compound.

The preparation of the foamed polyurethane materials may be carried out by the general methods fully described elsewhere. Thus the foam forming components may be mixed continuously or discontinuously in the presence of the gas generating agent to give a foam.

The foam forming gas may be generated by a variety of methods. For example the gas may be carbon dioxide generated by the reaction of a proportion of the organic isocyanate with water incorporated in the reaction mixture. Gas may also be generated by incorporating in the reaction mixture, an inert liquid of low boiling point which vapourises during the exothermic polyurethane foaming reaction. Mixtures of water with inert low boiling point liquids may be used if desired. Examples of such liquids are halogenated hydrocarbons such as methylene chloride, halomethanes and haloethanes. Mixtures of these low boiling-point liquids one with another and/or with other substituted or unsubstituted hydrocarbons may also be used. Such liquids are usually employed in amounts of from 5% to 50% by weight of the polyether.

Water is usually employed in amounts of from 1% to 10% by weight of the polyether when used as a gas-generating agent.

Catalysts for the polyurethane forming reaction may also be included, especially tertiary-amines, basic compounds and metal compounds. Foam stabilisers such as siloxane alkoxy ether copolymers may be present, together with additives such as pigments, flame retardants, fillers, chain extenders, cross-linking agents, plasticisers and antioxidants, each being used alone or in combination with the other additives.

Polyurethane foams made from polyether polyols described herein have advantageous properties, for example in the areas of enhanced compression strength, dimensional stability low thermal conductivity and closed cell content, alone or in combination, as will be shown in the relevant following examples, in which parts are by weight.

PROPOXYLATED POLYOLS AND PROPERTIES

Firstly, there is described the procedure used to propoxylate the polyhydric alcohol.

The polyhydric alcohol used in Examples 1 to 3 and in the comparative Example A was a mixture of polyhydric alcohols as follows:

| | |
|---|---|
| 5-(5-hydroxy methyl-1,3-dioxane)-methanol | 58.6% |
| 5-(5-hydroxy methyl-1,3-dioxane)-methoxy-methanol | 8.1% |
| pentaerythritol | 9.4% |
| pentaerythritol monohydroxymethylether | 8.7% |
| other polyhydric alcohols according to either of formula I and II each individually present at less than 3%, totalling | 15.2% |
| | 100.0% |

(% is given as percentage area of peaks of a gas chromatogram of the mixture after conversion into trimethyl silyl ether derivatives)

x parts of the above polyhydric alcohol composition containing 0.5% by weight of sodium formate was charged to a stainless steel reactor, and purged well with nitrogen. Water and other volatiles were removed by heating to 130° C. with stirring at a pressure of 30 mm of mercury. y parts of propylene oxide were added over 4 hours. The exothermic reaction caused the temperature to rise to 160° C., and cooling water was applied to control the reaction when the maximum temperature had been attained. After a further 2 hours at 155°–160° C. any residual propylene oxide was removed by evacuation, maintaining the pressure at 30 mm of mercury for 1 hour. The product was cooled to 90° C.

and water, equivalent to 5% of the batch weight, added. The aqueous product was passed through an ion-exchange column containing 'Amberlite' IR120 resin at 90° C. Finally, the water was removed at 120° C. with stirring at a pressure of 30 mm of mercury until the water content was less than 0.1%. In Examples 2 and 3, after removal of propylene oxide and cooling down to 44° C., the product was ion exchanged at 40° C.

From a waste stream of pentaerythritol manufacture, with the same components but with different relative concentrations (20% 5(5-hydroxy methyl-1,3-dioxane)-methanol, 10% pentaerythritol, 60% other polyformates) two more polyols have been made. The general oxypropylation process was similar to the previous examples except for the final work-up: the catalyst was neutralised with phosphoric acid and filtered. The polyols, made in this way are examples 4 and 5 in Table 1.

Varying ratios of polyhydric alcohol to propylene oxide were used in order to evaluate derivatives of different hydroxyl value. Product of Examples 1 to 5 are in accordance with the present invention while comparative Example A is outside the defined range. Table 1 gives the starting amounts of reactants and resultant product properties.

TABLE 1

| Example | x | y | Hydroxyl value (mgKOH/g) | Acid value (mgKOH/g) | Viscosity mPa sec |
|---|---|---|---|---|---|
| A | 4078 | 11330 | 310 | 0.44 | 1374 |
| 1 | 8132 | 2302 | 605 | 0.46 | 11044 |
| 2 | 5084 | 3612 | 491 | 0.37 | 2955 |
| 3 | 5084 | 2900 | 539 | 0.48 | 4184 |
| 4 | 27260 | 22280 | 515 | 0.76 | 6990 |
| 5 | 30780 | 20770 | 560 | 1.00 | 9300 |

EXAMPLE 6

Using the procedure described in Example 1, 3493 parts of 5-(5 hydroxy methyl-1,3-dioxane)-methanol containing 0.6% by weight of sodium acetate was reacted with 1550 parts of propylene oxide, to give a product with a hydroxyl value of 527 mg KOH/g, an acid value of 0.28 mg KOH/g, and a viscosity of 1900 m Pa sec. This polyol is used to make polyurethane rigid foams.

EXAMPLE 7

Using the procedure described in Example 1, 4100 parts of the polyhydric alcohol containing sodium formate was reacted with 1170 parts of propylene oxide followed by 900 parts of ethylene oxide, to give a product with hydroxyl value of 556 mg KOH/g, an acid value of 0.48 mg KOH/g and a viscosity of 3015 mPa sec at 25° C. after removal of the catalyst by precipitation with tartaric acid and subsequent filtration, the ion-exchange procedure being omitted. This polyester is useful for making rigid polyurethane foam.

EXAMPLE 8

As in the previous examples 3960 parts of the polyhydric alcohol containing sodium formate was reacted with 1070 parts of propylene oxide followed by 1070 parts of ethylene oxide, to give a product with a hydroxyl value of 545 mg KOH/g, an acid value of 0.15 mg KOH/g and a viscosity of 2875 mPa sec at 25° C. after removal of the catalyst by precipitation with tartaric acid and subsequent filtration, the ion-exchange procedure being omitted. This polyether is useful for making rigid polyurethane foam.

FOAM EXAMPLES AND PROPERTIES

The polyurethane rigid foams, made from the polyols, described in Examples A and 1 to 3, and blends thereof are described in Tables 1 to 4. The polyol, described in Example 1, will hereafter be called polyol 1. The same notation applies to polyols from Examples A, 2 and 3.

The foam-forming chemicals, used in formulations A to J, were mixed and dispensed by means of a Viking M 29 low pressure dispensing machine, set to an output of approximately 34 kg/minute with a shot-time of 8 seconds. 4.4–4.8 kg of foam was obtained having a density of 30–32 kg/m$^3$ (Foams described in Tables 3 and 4). For the higher density blocks of Table 2, an output of about 27 kg/min and a shot-time of 18 seconds was used, 7–8 kg of foam was obtained. The mixed chemicals of formulations A to J were collected in a cubic wooden mould of 50 cm $\times$ 50 cm $\times$ 50 cm.

Formulations K and L have been evaluated on smaller scale, the chemicals being mixed by means of a low energy impingement mixer. Blocks of 18 cm $\times$ 18 cm $\times$ 33 cm were made. Polyol X is a proprietary polyol which is an oxypropylated pentaerythritol of properties given in Table 5. This is included for comparative purposes to demonstrate the relative advantages of the polyols of the invention.

Notes on Tables 2 to 5

Unless stated otherwise, the chemical compositions of formulations A to I are expressed in parts by weight. Fluorocarbon tolerance is defined as the maximum solubility of fluorocarbon ("ARCTON" 11 from ICI), expressed in parts by weight per 100 parts by weight of polyol blend, including the surfactants, excluding catalyst. Physical properties of formulations A to J (Tables 2, 3 and 4) have been measured after 7 days ageing of the blocks. Blocks were demoulded one hour after dispensing of the chemicals. Physical properties of formulations K and L (Table 5) have been measured after 3 days ageing of the blocks. Blocks were demoulded one hour after dispensing of the chemicals. Dimensional stability is tested on cubes of 5 cm $\times$ 5 cm $\times$ 5 cm. The volume change after 24 hours at 125° C. is measured and the difference expressed in percent; positive values refer to expansion (Tables 3 and 5). 10% Compression strength is measured according to the DIN 53.421 test. Friability is measured according to BS 4370, Part 3, method N° 12. The thermal conductivity ($\lambda$-value) was measured according to ISO 2581, method S.

Proprietary materials used in the formulations are listed below; names marked by asterisk are trademarks.

| Name | Composition | Company |
|---|---|---|
| Catalyst SFC: | N,N—dimethylcyclohexylamine | ICI |
| Surfactant B 8404: | Siloxane copolymerised with polyether | Goldschmidt Laboratories |
| Arcton* 11: | trichloromonofluromethane | ICI |
| Suprasec* VM 90: | polymeric MDI | ICI |
| Polyol X: | oxypropylated pentaerythritol | (not quoted) |

TABLE 2

|  | A | B | C | D |
|---|---|---|---|---|
| Polyol A | — | 20 | 30 | 60 |
| Polyol 1 | 100 | 80 | 70 | 40 |

TABLE 2-continued

|  | A | B | C | D |
|---|---|---|---|---|
| Surfactant B 8404 | 1 | 1 | 1 | 1 |
| Catalyst SFC | 0.5 | 0.5 | 0.5 | 0.5 |
| ARCTON 11 fluorocarbon | 18 | 16 | 13 | 12 |
| SUPRASEC VM 90 Isocyanate (index 1.10) | 166 | 150 | 142 | 118 |
| Fluorocarbon tolerance | 18 | 36 | 50 | >100 |
| Hydroxyl value of polyol blend (mgKOH/g) | 605 | 546 | 516 | 428 |
| Density (kg/m$^3$) | 72 | 73 | 83 | 75 |
| Dimensional Stability ΔV % at 125° C./1 day) | 0.80 | 0.86 | 0.40 | 6.93 |

TABLE 3

|  | E | F | G | H |
|---|---|---|---|---|
| Polyol A | 20 | 30 | 60 | 90 |
| Polyol 1 | 80 | 70 | 40 | 10 |
| Surfactant B 8404 | 1 | 1 | 1 | 1 |
| Catalyst SFC | 0.5 | 0.5 | 0.5 | 0.5 |
| ARCTON 11 | 40 | 38 | 38 | 36 |
| SUPRASEC VM 90 Isocyanate (index 1.10) | 150 | 142 | 118 | 96 |
| Hydroxyl value of polyol blend (mgKOH/g) | 546 | 516 | 428 | 339 |
| Density (kg/m$^3$) | 32 | 31 | 30 | 30 |
| *10% Compression Strength* |  |  |  |  |
| Parallel to rise (kN/m$^2$) | 341 | 278 | 192 | 120 |
| Perpendicular to rise (kN/m$^2$) | 69 | 76 | 73 | 53 |
| Friability (%) | 2.9 | 1.4 | 1.9 | 1.7 |

TABLE 4

|  | I | J |
|---|---|---|
| Polyol 2 | 100 | — |
| Polyol 3 | — | 100 |
| Surfactant B 8404 | 1 | 1 |
| Catalyst SFC | 0.5 | 0.5 |
| ARCTON 11 fluorocarbon | 35 | 35 |
| SUPRASEC VM 90 Isocyanate (index 1.10) | 134 | 147 |
| Hydroxyl value (mgKOH/g) | 491 | 539 |
| Density (kg/m$^3$) | 32 | 32 |
| Fluorocarbon tolerance | 91 | 52 |
| *10% Compression Strength* |  |  |
| Parallel to rise (kN/m$^2$) | 258 | 300 |
| Perpendicular to rise (kN/m$^2$) | 86 | 90 |
| *Dimensional Stability* |  |  |
| (ΔV % at 125°C./1 day) | 16.1 | 0.8 |
| λ - value after 4 days (mW/m. °K.) | 17.1 | 17.0 |

TABLE 5

Comparison with polyol based on pure pentaerythritol

|  | Polyol 3 | Polyol X |
|---|---|---|
| *Polyol specifications* |  |  |
| Hydroxyl value (mgKOH/g) | 539 | 550 |
| Viscosity (Poise/25° C.) | 41 | 45 |
| Functionality | 2.68 | 3.92 |
| *Formulation and foam properties* | K | L |
| Polyol 3 | 100 | — |
| Polyol X | — | 100 |
| Surfactant B 8404 | 1 | 1 |
| Catalyst SFC | 0.5 | 0.5 |
| SUPRASEC VM 90 Isocyanate (Index 1.10) | 147 | 150 |
| Density (kg/m$^3$) | 34 | 35 |
| *10% Compression Strength (kN/m$^2$)* |  |  |
| Parallel to rise | 285 | 233 |
| Perpendicular to rise | 109 | 100 |
| Dimensional Stability (*) Δ length % | −0.09 | −0.03 |
| at −15° C. after 14 days ) Δ width % | −0.35 | −0.06 |
| ) Δ thickness % | −0.28 | −0.24 |
| Friability (%) | 2.3 | 15.8 |

(*) According to NF T 56-122

DISCUSSION OF THE EXAMPLES AND COMPARATIVE RESULTS

Tables 2 and 3 show the effect of blending a polyether polyol according to the invention with a polyol (Polyol A) of lower hydroxyl value to achieve a range of hydroxyl values within the scope of the invention. At higher hydroxyl values, physical properties of the foams are good, but it may not be possible to introduce sufficient fluorocarbon to achieve low densities. At the lower end of the range, dimensional stability begins to degrade. These process and property limits give rise to the defined hydroxyl value range of 400 to 650 mgKOH/g. Table 3 shows poorer friability above 550 mgKOH/g hydroxyl value, but better compression strength at higher values. Taken together, these tables show the basis for selecting hydroxyl values of 490 to 575 mgKOH/g. Based on these conclusions, Polyols 2 and 3 were prepared with target hydroxyl values in the range 500 to 550. Fluorocarbon tolerance and physical properties are seen to be optimised in this range, and overall, hydroxyl values in the range 535 to 565 are seen to be optimum. Reference to Table 5 shows that Polyol X, with very similar specification to the preferred polyols of the invention, gives rise to foams having worse compression strength and friability.

We claim:

1. A polyether polyol having an average hydroxyl value in the range 400 to 650 mgKOH/g which is an alkoxylated derivative of a polyhydric alcohol being itself a single compound or a mixture of compounds according to the general formula (I)

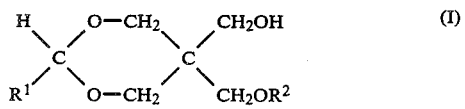

where
R$^1$ is —H, —CH$_3$ or OCH$_3$
R$^2$ is —H, —CH$_2$OH or —CH$_2$ C(CH$_2$OH)$_3$.

2. A polyether polyol composition comprising a polyether polyol according to claim 1 which also contains at least 5% by weight of an alkoxylated derivative of a polyhydric alcohol or mixtures thereof of the general formula (II)

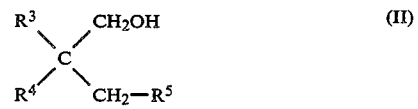

where R$^3$ and R$^4$ which may be the same or different are selected from —H, —CH$_2$OH and —CH$_2$OCH$_3$ provided that only one of R$^3$ or R$^4$ may be —CH$_2$OCH$_3$; and
where R$^5$ is —OH, —OCH$_2$OH, or OCH$_2$C(CH$_2$OH)$_3$.

3. A polyether polyol composition which is prepared by the addition of alkylene oxide to a mixture of compounds having active hydrogen-containing groups capable of alkoxylation, at least 10 percent by weight of said compounds being one or more polyhydric alcohols according to claim 1.

4. A polyether polyol composition which is a mixture of alkoxylated compounds at least 10 percent by weight of which is an alkoxylated derivative of a polyhydric alcohol according to claim 1.

5. A polyether polyol composition according to claim 3 or claim 4 in which there is also present at least 5% by weight of an alkoxylated derivative of polyhydric alcohol or mixtures thereof of general formula (II).

6. A polyether polyol or composition according to any one of claims 1 to 5 in which the alkoxylated derivatives are propoxylated derivatives.

7. A polyether polyol according to any one of claims 1 to 6 which has an average hydroxyl value in the range of 490 to 575 mg KOH/g.

8. A polyether polyol according to any one of claims 1 to 7 in which the weight average functionality is in the range 2.3 to 2.8.

9. A polyol composition comprising a polyether polyol according to any one of claims 1 to 8 in which there is also present from 5 to 95% by weight of a hydroxy terminated polyester or polyester amide.

10. A polyol blend comprising one or more polyols according to any one of the claims 1 to 8.

11. A process for making a polyurethane product by reaction of a polyol according to any one of claims 1 to 9 with an polyisocyanate.

12. A process for making a rigid polyurethane foam in which a polyol according to any one of claims 1 to 9 is reacted with an polyisocyanate having a weight average functionality in the range 2.7 to 3.3, in the presence of a blowing agent.

* * * * *